(12) United States Patent
Phelps et al.

(10) Patent No.: US 9,815,027 B2
(45) Date of Patent: Nov. 14, 2017

(54) GAS SCOURING APPARATUS FOR IMMERSED MEMBRANES

(71) Applicants: Roger Phelps, Kings Langley (AU); Joan-Amanda Lenting, Kings Langley (AU); William E. Davis, Kings Langley (AU)

(72) Inventors: Roger Phelps, Kings Langley (AU); Joan-Amanda Lenting, Kings Langley (AU); William E. Davis, Kings Langley (AU)

(73) Assignee: Evoqua Water Technologies LLC, Pittsburgh, PA (US)

( * ) Notice: Subject to any disclaimer, the term of this patent is extended or adjusted under 35 U.S.C. 154(b) by 325 days.

(21) Appl. No.: 14/428,718

(22) PCT Filed: Sep. 19, 2013

(86) PCT No.: PCT/US2013/060512
§ 371 (c)(1),
(2) Date: Mar. 17, 2015

(87) PCT Pub. No.: WO2014/052139
PCT Pub. Date: Apr. 3, 2014

(65) Prior Publication Data
US 2015/0265973 A1  Sep. 24, 2015

(30) Foreign Application Priority Data
Sep. 27, 2012  (AU) ................................ 2012904222

(51) Int. Cl.
*B01D 65/02*  (2006.01)
*B01D 61/20*  (2006.01)
(Continued)

(52) U.S. Cl.
CPC ............. *B01D 65/02* (2013.01); *B01D 61/20* (2013.01); *B01D 65/08* (2013.01); *B01D 61/14* (2013.01);
(Continued)

(58) Field of Classification Search
None
See application file for complete search history.

(56) References Cited

U.S. PATENT DOCUMENTS

| | | | |
|---|---|---|---|
| 256,008 | A | 4/1882 | Leak |
| 285,321 | A | 9/1883 | Tams |

(Continued)

FOREIGN PATENT DOCUMENTS

| | | |
|---|---|---|
| AU | 34400/84 A | 4/1985 |
| AU | 77066/87 A | 2/1988 |

(Continued)

OTHER PUBLICATIONS

Native Dynamics, Neutrium.com, "Pressure loss from pipe entrances and exits," Jan. 3, 2013.*

(Continued)

*Primary Examiner* — Chester Barry

(57) ABSTRACT

Disclosed herein are aspects and embodiments of an apparatus for providing gas slugs in a liquid. In one example, the apparatus comprises a housing defining a chamber, a bell tube including a wall and an open upper end disposed within the chamber, a riser tube including a wall, an open lower end, and a flared open upper end disposed within the bell tube, and a conduit defined between the wall of the bell tube and the wall of the riser tube and in fluid communication with an internal volume of the riser tube.

22 Claims, 4 Drawing Sheets

(51) Int. Cl.
*B01D 65/08* (2006.01)
*B01D 61/14* (2006.01)

(52) U.S. Cl.
CPC .......... *B01D 2311/2661* (2013.01); *B01D 2311/2665* (2013.01); *B01D 2311/2688* (2013.01); *B01D 2313/26* (2013.01); *B01D 2315/06* (2013.01); *B01D 2321/185* (2013.01)

(56) References Cited

U.S. PATENT DOCUMENTS

| | | | |
|---|---|---|---|
| 403,507 A | 5/1889 | Bode | |
| 511,995 A | 1/1894 | Buckley | |
| 1,997,074 A | 4/1935 | Novotny | |
| 2,080,783 A | 5/1937 | Petersen | |
| 2,105,700 A | 1/1938 | Ramage | |
| 2,843,038 A | 7/1958 | Manspeaker | |
| 2,926,086 A | 2/1960 | Chenicek et al. | |
| 3,068,655 A | 12/1962 | Murray et al. | |
| 3,139,401 A | 6/1964 | Hach | |
| 3,183,191 A | 5/1965 | Hach | |
| 3,191,674 A | 6/1965 | Richardson | |
| 3,198,636 A | 8/1965 | Bouthilet | |
| 3,228,876 A | 1/1966 | Mahon | |
| 3,246,761 A | 4/1966 | Bryan et al. | |
| 3,275,554 A | 9/1966 | Wagenaar | |
| 3,421,354 A * | 1/1969 | Strybel | B21D 39/06 |
| | | | 72/317 |
| 3,442,002 A | 5/1969 | Geary et al. | |
| 3,462,362 A | 8/1969 | Kollsman | |
| 3,472,168 A | 10/1969 | Inoue et al. | |
| 3,472,765 A | 10/1969 | Budd et al. | |
| 3,492,698 A | 2/1970 | Geary et al. | |
| 3,501,798 A | 3/1970 | Carraro | |
| 3,505,215 A | 4/1970 | Bray | |
| 3,556,305 A | 1/1971 | Shorr | |
| 3,563,860 A | 2/1971 | Henderyckx | |
| 3,591,010 A | 7/1971 | Pall et al. | |
| 3,592,450 A | 7/1971 | Rippon | |
| 3,625,827 A | 12/1971 | Wildi et al. | |
| 3,628,775 A | 12/1971 | McConnell et al. | |
| 3,654,147 A | 4/1972 | Levin | |
| 3,679,052 A | 7/1972 | Asper | |
| 3,689,009 A * | 9/1972 | Terrell | B65G 51/30 |
| | | | 406/110 |
| 3,693,406 A | 9/1972 | Tobin, III | |
| 3,700,561 A | 10/1972 | Ziffer | |
| 3,700,591 A | 10/1972 | Higley | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,795,609 A | 3/1974 | Hill et al. | |
| 3,804,258 A | 4/1974 | Okuniewski et al. | |
| 3,843,809 A | 10/1974 | Luck | |
| 3,876,738 A | 4/1975 | Marinaccio et al. | |
| 3,912,624 A | 10/1975 | Jennings | |
| 3,937,015 A | 2/1976 | Akado et al. | |
| 3,955,998 A | 5/1976 | Clampitt et al. | |
| 3,962,095 A | 6/1976 | Luppi | |
| 3,968,192 A | 7/1976 | Hoffman, III et al. | |
| 3,992,301 A | 11/1976 | Shippey et al. | |
| 3,993,816 A | 11/1976 | Baudet et al. | |
| 4,016,078 A | 4/1977 | Clark | |
| 4,049,765 A | 9/1977 | Yamazaki | |
| 4,076,656 A | 2/1978 | White et al. | |
| 4,082,683 A | 4/1978 | Galesloot | |
| 4,105,556 A | 8/1978 | O'Amaddio et al. | |
| 4,105,731 A | 8/1978 | Yamazaki | |
| 4,107,043 A | 8/1978 | McKinney | |
| 4,138,460 A | 2/1979 | Tigner | |
| 4,157,899 A | 6/1979 | Wheaton | |
| 4,169,873 A | 10/1979 | Lipert | |
| 4,183,890 A | 1/1980 | Bollinger | |
| 4,187,263 A | 2/1980 | Lipert | |
| 4,188,817 A | 2/1980 | Steigelmann | |
| 4,190,411 A | 2/1980 | Fujimoto | |
| 4,190,419 A | 2/1980 | Bauer | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A | 10/1980 | Bodnar et al. | |
| 4,230,583 A | 10/1980 | Chiolle et al. | |
| 4,243,525 A | 1/1981 | Greenberg | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,272,379 A | 6/1981 | Pollock | |
| 4,302,336 A | 11/1981 | Kawaguchi et al. | |
| 4,315,819 A | 2/1982 | King et al. | |
| 4,323,453 A | 4/1982 | Zampini | |
| 4,340,479 A | 7/1982 | Pall | |
| 4,350,592 A | 9/1982 | Kronsbein | |
| 4,353,802 A | 10/1982 | Hara et al. | |
| 4,359,359 A | 11/1982 | Gerlach et al. | |
| 4,367,139 A | 1/1983 | Graham | |
| 4,367,140 A | 1/1983 | Wilson | |
| 4,369,605 A | 1/1983 | Opersteny et al. | |
| 4,371,427 A | 2/1983 | Holler et al. | |
| 4,384,474 A | 5/1983 | Kowalski | |
| 4,388,189 A | 6/1983 | Kawaguchi et al. | |
| 4,389,363 A | 6/1983 | Molthop | |
| 4,405,688 A | 9/1983 | Lowery et al. | |
| 4,407,975 A | 10/1983 | Yamaguchi | |
| 4,414,113 A | 11/1983 | LaTerra | |
| 4,414,172 A | 11/1983 | Leason | |
| 4,415,452 A | 11/1983 | Heil et al. | |
| 4,431,545 A | 2/1984 | Pall et al. | |
| 4,451,369 A | 5/1984 | Sekino et al. | |
| 4,462,855 A | 7/1984 | Yankowsky et al. | |
| 4,467,001 A | 8/1984 | Coplan et al. | |
| 4,476,015 A | 10/1984 | Schmitt et al. | |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Muller | |
| 4,519,909 A | 5/1985 | Castro | |
| 4,539,940 A | 9/1985 | Young | |
| 4,540,490 A | 9/1985 | Shibata et al. | |
| 4,545,862 A | 10/1985 | Gore et al. | |
| 4,547,289 A | 10/1985 | Okano et al. | |
| 4,609,465 A | 9/1986 | Miller | |
| 4,610,789 A | 9/1986 | Barch | |
| 4,614,109 A | 9/1986 | Hofmann | |
| 4,623,460 A | 11/1986 | Kuzumoto et al. | |
| 4,623,670 A | 11/1986 | Mutoh et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,647,377 A | 3/1987 | Miura | |
| 4,650,586 A | 3/1987 | Ellis, III | |
| 4,650,596 A | 3/1987 | Schlueter et al. | |
| 4,656,865 A | 4/1987 | Callan | |
| 4,660,411 A | 4/1987 | Reid | |
| 4,666,543 A | 5/1987 | Kawano | |
| 4,670,145 A | 6/1987 | Edwards | |
| 4,673,507 A | 6/1987 | Brown | |
| 4,687,561 A | 8/1987 | Kunz | |
| 4,687,578 A | 8/1987 | Stookey | |
| 4,688,511 A | 8/1987 | Gerlach et al. | |
| 4,689,191 A | 8/1987 | Beck et al. | |
| 4,702,830 A | 10/1987 | Makino et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,749,487 A | 6/1988 | Lefebvre | |
| 4,752,421 A | 6/1988 | Makino | |

(56) References Cited

U.S. PATENT DOCUMENTS

| | | |
|---|---|---|
| 4,756,875 A | 7/1988 | Tajima et al. |
| 4,763,612 A | 8/1988 | Iwanami |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,812,235 A | 3/1989 | Seleman et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,931,186 A | 6/1990 | Ford et al. |
| 4,933,084 A | 6/1990 | Bandel et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,345 A * | 3/1995 | Park .............. A01K 87/002 156/172 |
| 5,401,401 A | 3/1995 | Hickok et al. |
| 5,401,405 A | 3/1995 | McDougald |
| 5,403,479 A | 4/1995 | Smith et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,484,528 A | 1/1996 | Yagi et al. |
| 5,490,939 A | 2/1996 | Gerigk et al. |
| 5,501,798 A | 3/1996 | Al-Samadi et al. |
| 5,525,220 A | 6/1996 | Yagi et al. |
| 5,531,900 A | 7/1996 | Raghavan et al. |
| 5,552,047 A | 9/1996 | Oshida et al. |
| 5,556,591 A | 9/1996 | Jallerat et al. |
| 5,597,732 A | 1/1997 | Bryan-Brown |
| 5,607,593 A | 3/1997 | Cote et al. |
| 5,626,755 A | 5/1997 | Keyser et al. |
| 5,633,163 A | 5/1997 | Cameron |
| 5,639,373 A | 6/1997 | Mahendran et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,918,264 A | 6/1999 | Drummond et al. |

(56) References Cited

U.S. PATENT DOCUMENTS

| | | |
|---|---|---|
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,036,030 A | 3/2000 | Stone et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A | 7/2000 | Connelly et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,149,817 A | 11/2000 | Peterson et al. |
| 6,156,200 A | 12/2000 | Zha et al. |
| 6,162,020 A | 12/2000 | Kondo |
| 6,193,890 B1 | 2/2001 | Pedersen et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,383,369 B2 | 5/2002 | Elston |
| 6,387,189 B1 | 5/2002 | Groschl et al. |
| 6,402,955 B2 | 6/2002 | Ookata |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,733 B1 | 2/2003 | Nonobe |
| 6,550,747 B2 | 4/2003 | Rabie et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,623,643 B2 | 9/2003 | Chisholm et al. |
| 6,627,082 B2 | 9/2003 | Del Vecchio et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,881,343 B2 | 4/2005 | Rabie et al. |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |

(56) References Cited

U.S. PATENT DOCUMENTS

| | | | |
|---|---|---|---|
| 7,314,563 B2 | 1/2008 | Cho et al. | |
| 7,329,344 B2 | 2/2008 | Jordan et al. | |
| 7,344,645 B2 | 3/2008 | Beck et al. | |
| 7,410,584 B2 | 8/2008 | Devine | |
| 7,455,765 B2 | 11/2008 | Elefritz et al. | |
| 7,481,933 B2 | 1/2009 | Barnes | |
| 7,507,274 B2 | 3/2009 | Tonkovich et al. | |
| 7,510,655 B2 | 3/2009 | Barnes | |
| 7,563,363 B2 | 7/2009 | Kuzma | |
| 7,591,950 B2 | 9/2009 | Zha et al. | |
| 7,632,439 B2 | 12/2009 | Mullette et al. | |
| 7,648,634 B2 | 1/2010 | Probst | |
| 7,662,212 B2 | 2/2010 | Mullette et al. | |
| 7,708,887 B2 | 5/2010 | Johnson et al. | |
| 7,713,413 B2 | 5/2010 | Barnes | |
| 7,718,057 B2 | 5/2010 | Jordan et al. | |
| 7,718,065 B2 | 5/2010 | Jordan | |
| 7,722,769 B2 | 5/2010 | Jordan et al. | |
| 7,761,826 B1 | 7/2010 | Thanvantri et al. | |
| 7,819,956 B2 | 10/2010 | Muller | |
| 7,850,851 B2 | 12/2010 | Zha et al. | |
| 7,931,463 B2 | 4/2011 | Cox et al. | |
| 8,002,246 B2 | 8/2011 | Eguchi et al. | |
| 8,197,688 B2 | 6/2012 | Sakashita et al. | |
| 8,679,337 B2 | 3/2014 | Ishibashi et al. | |
| 2001/0035092 A1 | 11/2001 | Hachimaki et al. | |
| 2001/0052494 A1 | 12/2001 | Cote et al. | |
| 2002/0027111 A1 | 3/2002 | Ando et al. | |
| 2002/0070157 A1 | 6/2002 | Yamada | |
| 2002/0117444 A1 | 8/2002 | Mikkelson et al. | |
| 2002/0148767 A1 | 10/2002 | Johnson et al. | |
| 2002/0153313 A1 | 10/2002 | Cote | |
| 2002/0185435 A1 | 12/2002 | Husain et al. | |
| 2003/0038080 A1 | 2/2003 | Vriens et al. | |
| 2003/0042199 A1 | 3/2003 | Smith | |
| 2003/0052055 A1 | 3/2003 | Akamatsu et al. | |
| 2003/0056919 A1 | 3/2003 | Beck | |
| 2003/0057155 A1 | 3/2003 | Husain et al. | |
| 2003/0062301 A1 | 4/2003 | Merrie et al. | |
| 2003/0075495 A1 | 4/2003 | Dannstrom et al. | |
| 2003/0075504 A1 | 4/2003 | Zha et al. | |
| 2003/0121855 A1 | 7/2003 | Kopp | |
| 2003/0127388 A1 | 7/2003 | Ando et al. | |
| 2003/0146153 A1 | 8/2003 | Cote et al. | |
| 2003/0159977 A1 | 8/2003 | Tanny et al. | |
| 2003/0159988 A1 | 8/2003 | Daigger et al. | |
| 2003/0196955 A1 | 10/2003 | Hughes | |
| 2003/0226797 A1 | 12/2003 | Phelps | |
| 2004/0007523 A1 | 1/2004 | Gabon et al. | |
| 2004/0007525 A1 | 1/2004 | Rabie et al. | |
| 2004/0035770 A1 | 2/2004 | Edwards et al. | |
| 2004/0045893 A1 | 3/2004 | Watanabe et al. | |
| 2004/0050791 A1 | 3/2004 | Herczeg | |
| 2004/0055974 A1 | 3/2004 | Del Vecchio et al. | |
| 2004/0108268 A1 | 6/2004 | Liu et al. | |
| 2004/0112831 A1 | 6/2004 | Rabie et al. | |
| 2004/0118779 A1 | 6/2004 | Rawson et al. | |
| 2004/0129637 A1 | 7/2004 | Husain et al. | |
| 2004/0149655 A1 | 8/2004 | Petrucco et al. | |
| 2004/0154671 A1 | 8/2004 | Martins et al. | |
| 2004/0168978 A1 | 9/2004 | Gray | |
| 2004/0173525 A1 | 9/2004 | Hunniford et al. | |
| 2004/0178136 A1 | 9/2004 | Taniguchi et al. | |
| 2004/0188339 A1 | 9/2004 | Murkute et al. | |
| 2004/0188341 A1 | 9/2004 | Zha et al. | |
| 2004/0222158 A1 | 11/2004 | Husain et al. | |
| 2004/0232076 A1 | 11/2004 | Zha et al. | |
| 2004/0245174 A1 | 12/2004 | Takayama et al. | |
| 2005/0000885 A1 | 1/2005 | Stockbower | |
| 2005/0006308 A1 | 1/2005 | Cote et al. | |
| 2005/0023219 A1 | 2/2005 | Kirker et al. | |
| 2005/0045557 A1 | 3/2005 | Daigger et al. | |
| 2005/0053878 A1 | 3/2005 | Bruun et al. | |
| 2005/0061725 A1 | 3/2005 | Liu et al. | |
| 2005/0077227 A1 | 4/2005 | Kirker et al. | |
| 2005/0098494 A1 | 5/2005 | Mullette et al. | |
| 2005/0103722 A1 | 5/2005 | Freydina et al. | |
| 2005/0109692 A1 | 5/2005 | Zha et al. | |
| 2005/0115880 A1 | 6/2005 | Pollock | |
| 2005/0115899 A1 | 6/2005 | Liu et al. | |
| 2005/0121389 A1 | 6/2005 | Janson et al. | |
| 2005/0126963 A1 | 6/2005 | Phagoo et al. | |
| 2005/0161389 A1 | 7/2005 | Takeda et al. | |
| 2005/0184008 A1 | 8/2005 | Schacht et al. | |
| 2005/0194305 A1 | 9/2005 | Vido et al. | |
| 2005/0194310 A1 | 9/2005 | Yamamoto et al. | |
| 2005/0194315 A1 | 9/2005 | Adams et al. | |
| 2006/0021929 A1 | 2/2006 | Mannheim et al. | |
| 2006/0033222 A1 | 2/2006 | Godfrey et al. | |
| 2006/0049093 A1 | 3/2006 | Chikura et al. | |
| 2006/0065596 A1 | 3/2006 | Kent et al. | |
| 2006/0081533 A1 | 4/2006 | Khudenko | |
| 2006/0091074 A1 | 5/2006 | Pedersen et al. | |
| 2006/0145366 A1* | 7/2006 | Thomas | B01F 3/04241 |
| | | | 261/79.2 |
| 2006/0201879 A1 | 9/2006 | Den Boestert et al. | |
| 2006/0249448 A1 | 11/2006 | Fujishima et al. | |
| 2006/0249449 A1 | 11/2006 | Nakhla et al. | |
| 2006/0273007 A1 | 12/2006 | Zha et al. | |
| 2006/0273038 A1 | 12/2006 | Syed et al. | |
| 2007/0039888 A1 | 2/2007 | Ginzburg et al. | |
| 2007/0045183 A1 | 3/2007 | Murphy | |
| 2007/0051679 A1 | 3/2007 | Adams et al. | |
| 2007/0075017 A1 | 4/2007 | Kuzma | |
| 2007/0084791 A1 | 4/2007 | Jordan et al. | |
| 2007/0084795 A1 | 4/2007 | Jordan | |
| 2007/0095741 A1 | 5/2007 | Berends | |
| 2007/0102339 A1 | 5/2007 | Cote et al. | |
| 2007/0108125 A1 | 5/2007 | Cho et al. | |
| 2007/0138090 A1 | 6/2007 | Jordan et al. | |
| 2007/0163942 A1 | 7/2007 | Tanaka et al. | |
| 2007/0170112 A1 | 7/2007 | Elefritz et al. | |
| 2007/0181496 A1 | 8/2007 | Zuback | |
| 2008/0093297 A1 | 4/2008 | Gock et al. | |
| 2008/0179249 A1 | 7/2008 | Beck et al. | |
| 2008/0203017 A1 | 8/2008 | Zha et al. | |
| 2008/0257822 A1 | 10/2008 | Johnson | |
| 2008/0277340 A1 | 11/2008 | Hong et al. | |
| 2009/0001018 A1 | 1/2009 | Zha et al. | |
| 2009/0194477 A1 | 8/2009 | Hashimoto | |
| 2009/0218274 A1 | 9/2009 | Sakashita et al. | |
| 2010/0012585 A1 | 1/2010 | Zha et al. | |
| 2010/0025320 A1 | 2/2010 | Johnson | |
| 2010/0051545 A1 | 3/2010 | Johnson et al. | |
| 2010/0170847 A1 | 7/2010 | Zha et al. | |
| 2010/0200503 A1 | 8/2010 | Zha et al. | |
| 2010/0300968 A1 | 12/2010 | Liu et al. | |
| 2010/0326906 A1 | 12/2010 | Barnes | |
| 2011/0049047 A1 | 3/2011 | Cumin et al. | |
| 2011/0049048 A1 | 3/2011 | Benner et al. | |
| 2011/0056522 A1 | 3/2011 | Zauner et al. | |
| 2011/0100907 A1* | 5/2011 | Zha | B01D 63/024 |
| | | | 210/615 |
| 2011/0127209 A1 | 6/2011 | Rogers et al. | |
| 2011/0132826 A1 | 6/2011 | Muller et al. | |
| 2011/0139715 A1 | 6/2011 | Zha et al. | |
| 2011/0147298 A1 | 6/2011 | Kennedy | |
| 2011/0192783 A1 | 8/2011 | Cox et al. | |
| 2012/0074053 A1 | 3/2012 | Collignon et al. | |
| 2012/0091602 A1 | 4/2012 | Cumin et al. | |
| 2012/0097601 A1 | 4/2012 | Lee et al. | |
| 2012/0103904 A1 | 5/2012 | Morita et al. | |
| 2012/0285885 A1 | 11/2012 | James et al. | |
| 2013/0037467 A1 | 2/2013 | Biltoft et al. | |
| 2013/0056426 A1 | 3/2013 | Barnes | |
| 2013/0168307 A1 | 7/2013 | Drivarbekk et al. | |
| 2014/0174998 A1 | 6/2014 | Aerts et al. | |
| 2015/0136686 A1 | 5/2015 | Chen | |

FOREIGN PATENT DOCUMENTS

| | | |
|---|---|---|
| AU | 762091 B2 | 6/2003 |
| CA | 2531764 A1 | 3/2005 |
| CN | 2204898 Y | 8/1995 |

(56) References Cited

FOREIGN PATENT DOCUMENTS

| | | | |
|---|---|---|---|
| CN | 2236049 Y | 9/1996 |
| CN | 1541757 A | 11/2004 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 19718028 C1 | 6/1998 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 0012557 A1 | 6/1980 |
| EP | 0038612 B1 | 10/1981 |
| EP | 0090383 A2 | 10/1983 |
| EP | 126714 A2 | 11/1984 |
| EP | 194735 A2 | 9/1986 |
| EP | 250337 A1 | 12/1987 |
| EP | 327025 A1 | 8/1989 |
| EP | 344633 A1 | 12/1989 |
| EP | 407900 A2 | 1/1991 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 A1 | 7/1994 |
| EP | 627255 A1 | 12/1994 |
| EP | 395133 A1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1156015 A1 | 11/2001 |
| EP | 1236503 A1 | 8/2004 |
| EP | 1466658 A1 | 10/2004 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53-5077 | 1/1978 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60206412 A | 10/1985 |
| JP | 60260628 A | 12/1985 |
| JP | 61097005 A | 5/1986 |
| JP | 61097006 A | 5/1986 |
| JP | 61107905 A | 5/1986 |
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 | 11/1986 |
| JP | 61263605 A | 11/1986 |
| JP | 61291007 A | 12/1986 |
| JP | 61293504 A | 12/1986 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 | 4/1989 |
| JP | 01151906 A | 6/1989 |
| JP | 01-307409 A | 12/1989 |
| JP | 02-017925 | 1/1990 |
| JP | 02017924 | 1/1990 |
| JP | 02026625 A | 1/1990 |
| JP | 02031200 A | 2/1990 |
| JP | 02040296 A | 2/1990 |
| JP | 02107318 A | 4/1990 |
| JP | 02126922 A | 5/1990 |
| JP | 02144132 A | 6/1990 |
| JP | 02164423 A | 6/1990 |
| JP | 02174918 A | 7/1990 |
| JP | 02241523 A | 9/1990 |
| JP | 02277528 A | 11/1990 |
| JP | 02284035 A | 11/1990 |
| JP | 03018373 A | 1/1991 |
| JP | 03028797 A | 2/1991 |
| JP | 03-086529 A | 4/1991 |
| JP | 03110445 A | 5/1991 |
| JP | 04108518 A | 4/1992 |
| JP | 04110023 A | 4/1992 |
| JP | 4-190889 | 7/1992 |
| JP | 04187224 A | 7/1992 |
| JP | 4-256425 | 9/1992 |
| JP | 04250898 A | 9/1992 |
| JP | 04256424 A | 9/1992 |
| JP | 04265128 A | 9/1992 |
| JP | 04293527 A | 10/1992 |
| JP | 04310223 A | 11/1992 |
| JP | 04317793 A | 11/1992 |
| JP | 04334530 A | 11/1992 |
| JP | 04348252 A | 12/1992 |
| JP | 05-4030 | 1/1993 |
| JP | 05023557 A | 2/1993 |
| JP | 05096136 A | 4/1993 |
| JP | 05137977 A | 6/1993 |
| JP | 05157654 A | 6/1993 |
| JP | 05161831 A | 6/1993 |
| JP | 05184884 A | 7/1993 |
| JP | 05285348 A | 11/1993 |
| JP | 05305221 A | 11/1993 |
| JP | 06-027215 A | 2/1994 |
| JP | 06071120 A | 3/1994 |
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 A | 10/1994 |
| JP | 06277469 A | 10/1994 |
| JP | 06285496 A | 10/1994 |
| JP | 06343837 A | 12/1994 |

(56) References Cited

FOREIGN PATENT DOCUMENTS

| | | |
|---|---|---|
| JP | 07000770 A | 1/1995 |
| JP | 07024272 A | 1/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004337730 A | 12/2004 |
| JP | 2005-087887 A | 4/2005 |
| JP | 2005144291 A | 6/2005 |
| JP | 2005154551 A | 6/2005 |
| JP | 2005279447 A | 10/2005 |
| JP | 2006116495 | 5/2006 |
| JP | 2007547083 | 8/2010 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |

(56) References Cited

FOREIGN PATENT DOCUMENTS

| | | |
|---|---|---|
| NL | 1020491 C | 10/2003 |
| NL | 1021197 C | 10/2003 |
| TW | 216773 B | 12/1993 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 9908773 A1 | 2/1999 |
| WO | 99-55448 A1 | 11/1999 |
| WO | 9959707 A1 | 11/1999 |
| WO | 0018498 A1 | 4/2000 |
| WO | 0021890 A1 | 4/2000 |
| WO | 0030740 A1 | 6/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0204100 | 1/2002 |
| WO | 0211867 A1 | 2/2002 |
| WO | 0226363 A2 | 4/2002 |
| WO | 0230550 A1 | 4/2002 |
| WO | 0238256 A1 | 5/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006017911 A1 | 2/2006 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2013048801 A1 | 4/2013 |
| WO | 2013049109 A1 | 4/2013 |

OTHER PUBLICATIONS

Almulla et al., "Developments in high recovery brackish water desalination plants as part of the solution to water quantity problems," Desalination, 153 (2002), pp. 237-243.
Anonymous, "Nonwoven Constructions of Dyneon™ THV and Dyneon™ HTE Fluorothermoplastics", Research Disclosure Journal, Apr. 1999, RD 420013, 2 pages.
Cote et al. "A New Immersed Membrane for Pretreatment to Reverse Osmosis," Desalination, 139 (2001), pp. 229-236.
Cote et al., "Immersed Membranes Activated Sludge Process Applied to the Treatment of Municipal Wastewater," Wat. Sci. Tech. 38(4-5) (1998), pp. 437-442.
Coulson et al., "Coulson and Richardson's Chemical Engineering," 1999, vol. 1, pp. 358-364.
Crawford et al., American Water Works Association Membrane Technology Conference, "Procurement of Membrane Equipment: Differences Between Water Treatment and Membrane Bioreactor (MBR) Applications," (2003).
Cui et al., "Airlift crossflow membrane filtration—a feasibility study with dextran ultrafiltration," J. Membrane Sci. (1997) vol. 128, pp. 83-91.
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent et al., "Neural networks for long term prediction of fouling and backwash efficiency in ultrafiltration for drinking water production," Desalination 131 (2000) pp. 353-362.
Dow Chemical Company, "Filmtec Membranes—Cleaning Procedures for Filmtec FT30 Elements," Tech Facts, Online, Jun. 30, 2000, XP002237568.
EPA, Membrane Filtration Guidance Manual, Nov. 2005.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999, Chapters 2 and 5.

(56) References Cited

OTHER PUBLICATIONS

Judd, "The MBR Book: Principles and Applications of Membrane Bioreactors in Water and Wastewater Treatment," (2006), pp. 174-178.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system," Water Research, 37(5) Mar. 2003, pp. 1192-1197, Elsevier, Amsterdam, NL.
Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic," Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Miller et al., "Side Stream Air Lift MBR Development and Successful Application of a New Generation of MBR," Pollution Solutions Brochure, NORIT, The Netherlands, Apr. 2008.
Nakayama, "Introduction to Fluid Mechanics," Butterworth-Heinemann, Oxford, UK, 2000.
Ramaswammy S. et al. "Fabrication of Ply (ECTFE) Membranes via Thermally Induced Phase Separation", Journal of Membrane Science, (Dec. 1, 2002), pp. 175-180, vol. 210 No. 1, Scientific Publishing Company, Amsterdam, NL.
Rosenberger et al., "Filterability of activated sludge in membrane bioreactors," Desalination, 151 (2002), pp. 195-200.
Schematic of 4" Geyser Pump, Geyser Pump Tech. Co., Nov. 13, 2005.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmmrw.interscience.wiley.com/eow/.
White et al., "Optimisation of intermittently operated microfiltration processes," The Chemical Engineering Journal, 52 (1993), pp. 73-77.
Wikipedia, "Seawater," available at http://en.wikipedia.org/wiki/Seawater, Jul. 15, 2007.
Yamamoto et al., "Direct Solid-Liquid Separation Using Hollow Fiber Membrane in an Activated Sludge Aeration Tank," Water Science Technology, 21 (1989), pp. 43-54.
Yoon: "Important operational parameters of membrane bioreactor-sludge disintegration (MBR-SD) system for zero excess sludge production" Water Research, 37 (2003), pp. 1921-1931, Elsevier, Amsterdam, NL.
Zenon, "Proposal for ZeeWeed® Membrane Filtration Equipment System for the City of Westminster, Colorado, Proposal No. 479-99," Mar. 2000, entire publication.
U.S. Appl. No. 13/436,219, filed Mar. 30, 2013.
U.S. Appl. No. 12/792,307, filed Jun. 2, 2010.
U.S. Appl. No. 13/396,275, filed Feb. 14, 2012.
U.S. Appl. No. 13/943,411, filed Jul. 16, 2013.
U.S. Appl. No. 14/177,749, filed Feb. 11, 2014.
U.S. Appl. No. 14/090,491, filed Nov. 26, 2013.
U.S. Appl. No. 12/096,279, filed Dec. 11, 2006.
U.S. Appl. No. 12/439,209, filed Aug. 30, 2007.
U.S. Appl. No. 13/059,283, filed Aug. 17, 2009.
Lu, et al., "The Influence of Bubble Characteristic on the Performance of Submerged Hollow Fiber Membrane Module Used in Microfiltration," Separation and Technology, 61 (2008), pp. 89-95.

* cited by examiner

GAS SCOURING APPARATUS FOR IMMERSED MEMBRANES

RELATED APPLICATIONS

The present application claims priority to Australian provisional application number 2012904222 titled A GAS SCOURER FOR IMMERSED MEMBRANES, filed on Sep. 27, 2012.

BACKGROUND

1. Technical Field

Aspects and embodiment disclosed herein relate to a gas scouring apparatus and, more particularly, to a gas scouring apparatus for use in a fluid filtration system to inhibit fouling of immersed fluid filtration membranes.

2. Discussion of Related Art

The importance of filtration membranes for treatment of wastewater is growing rapidly. It is now well known that membrane processes can be used in an effective tertiary treatment system for wastewater including, for example, sewage and provide quality effluent. However, the capital and operating costs of such systems may in some instances be prohibitive. With the arrival of submerged membrane processes where the filtration membrane modules are immersed in a large feed tank and filtrate is collected through suction applied to the filtrate side of the membrane or through gravity feed, membrane bioreactors combining biological and physical processes in one stage promise to be more compact, efficient and economic. Due to their versatility, the size of membrane bioreactors can range from household (such as septic tank systems) to sizes appropriate for use in community and large-scale sewage treatment.

The success of a membrane filtration process largely depends on employing an effective and efficient membrane cleaning method. Commonly used physical cleaning methods include backwash (backpulse, backflush) using a liquid permeate, a gas, or combination thereof, and/or membrane surface scrubbing or scouring using a gas in the form of bubbles in a liquid. Typically, in gas scouring systems, a gas is injected, usually by means of a blower, into a liquid system where a membrane module is submerged to form gas bubbles. The bubbles so formed then travel upwards to scrub surfaces of the filtration membranes in the membrane module to remove fouling substances formed or deposited on the membrane surfaces. The shear force produced largely relies on the initial gas bubble velocity, bubble size, and the resultant of forces applied to the bubbles. The fluid transfer in this approach is limited to the effectiveness of the gas lifting mechanism. To enhance the scrubbing effect, more gas may be supplied. In some instances, this method consumes large amounts of energy. Moreover, in an environment of high concentration of solids, the to gas distribution system may gradually become blocked by dehydrated solids or simply be blocked when the gas flow accidentally ceases.

Furthermore, in an environment of high concentration of solids, the solid concentration polarization near the membrane surfaces may become significant during filtration where clean filtrate passes through membranes and a higher solid-content retentate is left, leading to an increased membrane resistance. Some of these problems have been addressed by the use of two-phase flow to clean the membranes.

Intermittent or cyclic aeration systems which provide gas bubbles on a cyclic basis are claimed to reduce energy consumption while still providing sufficient gas to effectively scrub the membrane surfaces. To provide for such intermittent operation, such systems normally require complex valve arrangements and control devices which tend to increase initial system cost and ongoing maintenance costs of the complex valve and switching arrangements required.

Known intermittent or cyclic aeration systems exist wherein the scouring process operates without complex valve switching. For example, Australian patent application number 200263139 describes such a system. The operation of such a system, however, is hampered when bubble distribution is uneven or when the bubbles do not scour the surfaces of all membranes in a membrane module.

SUMMARY

Aspects and embodiments disclosed herein seek to overcome or least ameliorate some of the disadvantages of the prior art or at least provide the public with a useful alternative.

According to one aspect, there is provided a gas scouring apparatus. The gas scouring apparatus comprises a housing defining a chamber, a bell tube including a wall and an open upper end disposed within the chamber, and a riser tube including a wall, an open lower end, and a flared open upper end disposed within the bell tube. A conduit is defined between the wall of the bell tube and the wall of the riser tube. The conduit is in fluid communication with an internal volume of the riser tube.

In some embodiments, the chamber includes an opening defined in a lower portion of the chamber.

In some embodiments, the riser tube is tapered, the open lower end of the riser tube having a smaller cross sectional area than the open upper end of the riser tube.

In some embodiments, the bell tube is centrally positioned within the chamber. The riser tube may be positioned concentrically within the bell tube.

In some embodiments, the bell tube includes a stepped-in neck portion having an open bottom end. The bell tube may be tapered, the open upper end of the bell tube having a greater cross sectional area than the open bottom end of the neck portion of the bell tube.

In some embodiments, the conduit includes a first opening within the chamber defined by a wall of the bell tube and a wall of the riser tube. The conduit may include a second opening defined in an upper surface of the housing. The second opening may be above the first opening. The second opening may be the flared open upper end of the riser tube.

In some embodiments, the conduit circumscribes the riser tube.

In some embodiments, the apparatus further comprises a gas inlet configured and arranged to deliver gas into the chamber.

According to another aspect, there is provided an assembly comprising a membrane module including a filtration membrane secured in a membrane anchor and a gas scouring apparatus positioned below the membrane anchor. The gas scouring apparatus includes a housing defining a chamber, a bell tube including a wall and an open upper end disposed within the chamber, and a riser tube including a wall, an open lower end, and a flared open upper end disposed within the bell tube. A conduit is defined between the wall of the bell tube and the wall of the riser tube. The conduit is in fluid communication with an internal volume of the riser tube.

In some embodiments, a space is defined between the gas scouring apparatus and the membrane anchor.

In some embodiments, the assembly comprises a plurality of membrane modules. The plurality of membrane modules may be mounted in a common manifold.

In some embodiments, the gas scouring apparatus is configured to deliver gas slugs to each of the plurality of membrane modules. The gas scouring apparatus may be configured to deliver gas slugs having a cross sectional area greater than the combined cross sectional area of each of the plurality of membrane modules.

In some embodiments, the gas scouring apparatus is connected to the membrane anchor. The membrane anchor may include an aperture configured to direct gas from the gas scouring apparatus into the membrane module.

In some embodiments, the bell tube includes an open bottom end and the assembly further comprises a gas outlet positioned to supply gas into the open bottom end of the bell tube.

According to another aspect, there is provided a method comprising immersing a filtration assembly in a liquid to be filtered. The assembly includes a membrane module including a filtration membrane secured in a membrane anchor and a gas scouring apparatus positioned below the membrane anchor. The gas scouring apparatus includes a housing defining a chamber, a bell tube including a wall and an open upper end disposed within the chamber, and a riser tube including a wall, an open lower end, and a flared open upper end disposed within the bell tube. A conduit is defined between the wall of the bell tube and the wall of the riser tube. The conduit is in fluid communication with an internal volume of the riser tube. The method further includes applying a gas at a substantially constant rate into the chamber.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
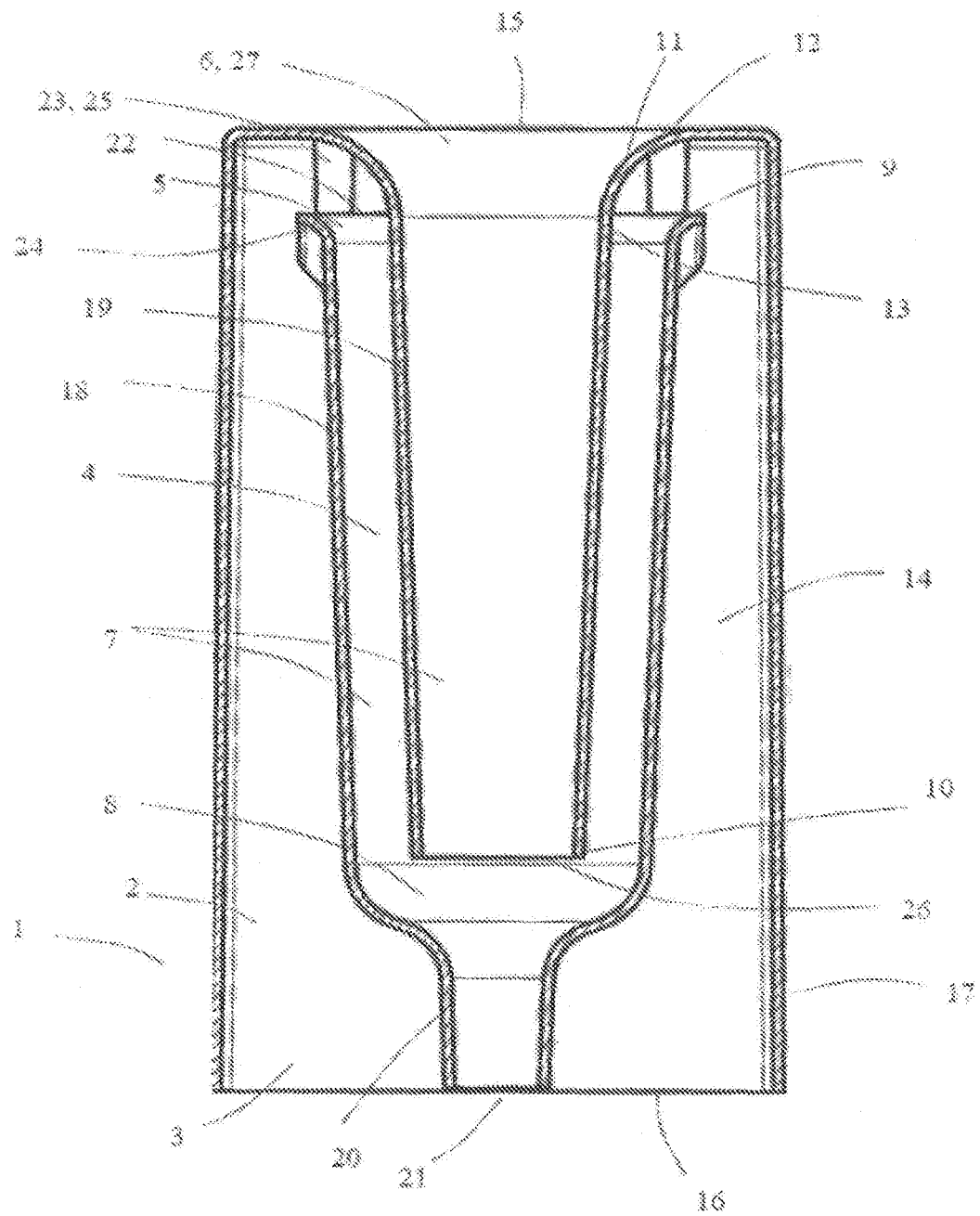
FIG. 1 is a simplified schematic cross-sectional elevational view of a gas scouring device according to one embodiment.

The aspects and embodiments disclosed herein are not limited in application to the details of construction and the arrangement of components set forth in the following description or illustrated in the drawings. The disclosed aspects and embodiments are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In accordance with various aspects and embodiments disclosed herein there is provided a method of filtering a liquid medium within a feed tank or vessel. The liquid medium may include, for example, water, wastewater, solvents, industrial runoff, fluids to be prepared for human consumption, or forms of liquid waste streams including components which are desired to be separated. Various aspects and embodiments disclosed herein include apparatus and methods for cleaning membrane filtration modules immersed in a liquid medium. In some aspects, the membrane modules are provided with a randomly generated intermittent or pulsed fluid flow comprising slugs of gas passing along surfaces of membranes within the membrane modules to dislodge fouling materials therefrom and reduce a solid concentration polarization about filtration membranes in the membrane modules.

As disclosed in co-pending U.S. patent application Ser. No. 12/792,307, titled MEMBRANE CLEANING WITH PULSED GAS SLUGS, filed Jun. 2, 2010, which is incorporated herein by reference, it has been discovered the cleaning of submerged filtration membranes by gas scouring may be improved by the provision of the gas in the form of gas slugs, instead of as small bubbles as in some previous methods. Gas slugs, as the term is used herein, are large volumes of gas which have dimensions approximating or exceeding the lateral extent of membrane bundles in a filtration module or group of modules which are scrubbed by the gas slugs. Small bubbles, as the term is used herein, refer to gas bubbles having dimensions significantly less than the lateral extent of membrane bundles in a filtration module or group of modules which are scrubbed by the gas bubbles. Without being bound to a particular theory, it is believed that a gas slug moving through a liquid medium causes pulsing pressure in liquid around the gas slug, with a higher pressure at the nose of the slug and lower pressure at its tail. This pulsing pressure can cause instability and disturbance of the onset of a concentration boundary layer near the surface of filtration membranes about which the gas slug may pass. It has been found that the scouring of filtration membranes with gas slugs can provide superior cleaning of filtration membranes as compared to scrubbing of the membranes with small bubbles. The superior cleaning provided by gas slugs may be achieved with a lower quantity of gas supplied and/or a lower amount of energy consumed than in systems utilizing small bubbles for scouring of filtration membrane modules.

Various aspects and embodiments disclosed herein provide a gas scouring apparatus and methods for providing gas slugs for the scouring of submerged liquid filtration membranes which have advantages over previously known apparatus. These advantages may include a lower capital and/or operational cost, a simpler and more easily maintained structure, and a more effective gas scouring system as compared to previously known systems.

In some embodiments, a gas scouring apparatus which, in use, may be positioned below a group of submerged filtration membranes includes a gas storage chamber which periodically releases a volume of gas into a lower portion of a riser tube. The riser tube expands in cross sectional area from the lower portion to an open ended upper portion. The open ended upper portion of the riser tube may include a flared opening. The volume of gas released into the riser tube from the gas storage chamber creates a gas slug which expands in cross sectional area as it travels upwards through the riser tube. The gas slug exits the riser tube from the open ended upper portion of the riser tube and passes into the group of submerged filtration membranes, scrubbing contaminants from the surfaces of the membranes. The gas slug may have a cross sectional area sufficient to simultaneously contact all filtration membranes in a group of filtration membranes associated with the gas scouring apparatus.

In some embodiments, the gas storage chamber is defined by a housing, a bell tube disposed within the housing and positioned about the riser tube, and a conduit defined between the bell tube and the riser tube. In some embodiments the bell tube may be tapered in a similar manner as the riser tube. The bell tube may include a flared open upper end. Gas may be supplied into the housing and may displace feed liquid from the housing. An interface between the gas and the feed liquid in the housing may reach the open upper end of the bell tube and enter the conduit defined between the bell tube and the riser tube through the open upper end of the bell tube. The gas may displace feed liquid from the conduit until an interface between the gas and the feed liquid reaches an open lower end of the riser tube. The gas may then surge into the riser tube and the conduit and housing may refill with feed liquid. The gas storage chamber may release volumes of gas into the riser tube which are generally random in volume at a generally random frequency.

In some embodiments, the bell tube may include an open lower end. Feed liquid may refill the conduit defined between the bell tube and the riser tube and/or the housing upon release of gas into the riser tube by passing through the open lower end of the bell tube. In some embodiments a source of gas distinct from that which is utilized to supply gas into the housing may supply gas bubbles into the open lower end of the bell tube. The gas bubbles introduced into the open lower end of the bell tube may pass into and through the riser tube and provide scrubbing of the submerged filtration membranes in addition to the scrubbing provided by the gas slugs.

Various embodiments disclosed herein may represent an improvement over previously known gas slug generating apparatus. The geometry of embodiments of the gas scouring apparatus disclosed herein, for example, the geometry of the riser tube in various embodiments, may provide for the production of gas slugs having a greater volume and/or cross sectional area with less energy and/or gas than would be required to form an equivalently sized gas slug using various previously known gas slug generating apparatus.

FIG. 1 depicts a gas scouring device according to one embodiment. The gas scouring device illustrated in FIG. 1 is configured and arranged to provide gas slugs in a liquid medium in which the gas scouring device may be immersed. The gas scouring device comprises a housing 1 defining a chamber 2 within the housing. The chamber 2 includes a lower opening 3. The lower opening 3 may be defined by walls of the chamber 2. The walls of the chamber 2 may extend downward to a common plane, or one or more walls, or portions of the one or more walls, may extend downward to a different extent than others of the walls. The chamber 2 may have an open lower end defining the lower opening 3. In some embodiments the lower opening 3 may have edges defining a plane which is substantially normal to a vertical axis of the housing 1, and in other embodiments may have edges defining a plane angled with respect to a vertical axis of the housing 1. The lower opening 3 provides for fluid communication between the inside and the outside of the chamber 2, for example, between an internal volume of the chamber 2 and fluid in which the gas scouring device may be immersed.

The gas scouring device further includes a conduit 4 defined within the housing 1. The conduit 4 includes a first opening 5 inside of the chamber 2, for example, proximate an upper portion of the chamber 2, and a second opening 6 in communication with the outside of the chamber, for example, through an open upper portion of the gas scouring device. The conduit 4 includes a channel 7 having a portion that extends downwards to a low point 8 of the conduit 4 in a direction from the first opening 5 to the second opening 6. The second opening 6 of the conduit 4 is positioned above the low point 8 of the conduit 4 and above the first opening 5 of the conduit.

The chamber 2 is adapted to accumulate and contain a pocket of gas (see FIG. 4) above an interface between the gas pocket and a liquid in which the gas scouring device may be immersed. A vertical position of the interface between the gas pocket and the liquid may vary during operation of the gas scouring device. For example, the vertical position of the interface between the gas pocket and the liquid may vary between at least a lower boundary 9 of the first opening 5 in the conduit 4 and an upper boundary 10 of the low point 8 of the conduit 4.

In some embodiments, the second opening 6 has a cross-sectional area greater than the cross-sectional area of the conduit 4 at the low point 8 of the conduit 4. In some embodiments, the second opening 6 has a cross-sectional area of at least about 1.5 times greater than the cross-sectional area of the conduit 4 at the low point 8 of the conduit 4. In alternate embodiments, the ratio between the cross-sectional area of the second opening 6 to the cross-sectional area of the conduit 4 at the low point 8 of the conduit 4 may be greater than 1:1 or greater than 1:1.5 provided that the gas scouring device remains capable of producing unitary gas slugs at the second opening 6. The provision of the second opening 6 with a cross-sectional area greater than that of the conduit 4 at the low point 8 of the conduit 4 provides for a gas slug introduced into the conduit 4 to expand as it travels upward from the from the low point 8 of the conduit 4 to the second opening 6. Providing for expansion of the gas slug within the conduit 4 provides for the design of the gas scouring apparatus to be compact while being capable of emitting large expanded gas slugs from the second opening 6 into spaces between filtration membranes positioned above the gas scouring apparatus.

The second opening 6 terminates in a flared trumpet-shaped portion 11. The cross sectional length at the widest point 12 of the flared portion 11 is in some embodiments approximately 120 mm. The cross sectional length at the narrowest point 13 of the flared portion 11 is in some embodiments approximately 60 mm. The distance between the widest 12 and the narrowest 13 cross sections is in some embodiments approximately 25 mm. In some embodiments, the flared portion 11 may expand in cross sectional area at a substantially constant rate along its height rather than being trumpet-shaped as illustrated.

In some embodiments, the housing 1 is shaped as a rectangular prism having four rectangular side surfaces 14, a top square surface 15, and a bottom square surface 16. The rectangular side surfaces 14 are illustrated in FIG. 1 with their longest edges 17 positioned vertically. In some embodiments, the rectangular side surfaces 14 may have dimensions of approximately 160 mm in width by approximately 315 mm in height. The square surfaces 15 and 16 may, in some embodiments, have approximate dimensions of 160 mm in width by 160 mm in depth. The housing 1 thus may, in some embodiments, have dimensions of approximately 160 mm in width by approximately 160 mm in depth by approximately 315 mm in height. Providing the housing 1 with a rectangular prism shape may provide an advantage in that a rectangular prism shaped housing may be easier to connect to additional identical housings 1 in a filtration system than housings having other shapes.

It will be appreciated, however, that in other embodiments, the housing 1 could be formed in alternative shapes. For example, the housing 1 may in some embodiments be substantially cylindrical in shape. Alternatively, the housing 1 may have a cross section in a plane normal to the vertical extent of the side surface or surfaces 14 which is oval, rectangular, or of any other regular or irregular polygonal shape as desired for a particular implementation. For example, in some embodiments, multiple gas scouring devices may be connected in an array where each of the housings of the multiple gas scouring devices is approximately hexagonal in cross section. The side surfaces 14 may be joined at substantially abrupt corners, or with rounded corners. The side surfaces 14 are illustrated in FIG. 1 as being substantially straight and parallel, however, in some embodiments, the side surfaces may be curved or stepped, and may taper toward or away from each other along a vertical direction. Further in some embodiments at least one of the side surfaces 14 may have different dimensions and/or a different shape than at least one other of the side surfaces 14.

The lower opening 3 of the chamber 2 is depicted in FIG. 1 as occupying the entire space between the lower edges of the side surfaces 14 of the housing 1. In other embodiments, the lower opening 3 may not extend entirely between the lower edges of each of the side surfaces 14 of the housing 1. A smaller chamber opening 3 would suffice provided it did not significantly impede flow of liquid and/or gas into the chamber 2. The chamber opening 3 is in some embodiments provided with a sufficiently large cross sectional area to provide for debris which may be present in a liquid in which the gas scouring apparatus is immersed to easily drain from the housing 1 and avoid potential blockages caused by the debris. In some embodiments, the housing 1 may include a lower wall including one or a plurality of apertures instead of the single opening 3.

The conduit 4 is defined by a first tube, referred to herein as bell tube 18 and a second tube, referred to herein as riser tube 19. The bell tube 18 includes, in some embodiments, a tapered cylinder of approximately 285 mm in height having an open top end 22. The top end 22 may terminate in a flared trumpet-shaped opening. The bell tube 18 may also, in some embodiments, include a lower stepped-in neck portion 20 having an open bottom end 21. The open bottom end 21, in some embodiments, has a smaller cross sectional area than the open top end 22. The open bottom end 21 may form the narrowest cross section of the stepped-in neck portion 20. In some embodiments, the open bottom end 21 has a diameter of approximately 25 mm and terminates at the level of the chamber opening 3. In other embodiments, the open bottom end may terminate above or below the level of the chamber opening 3. In some embodiments the open bottom end 21 may have edges defining a plane which is substantially normal to a vertical axis of the bell tube 18 and/or housing 1, and in other embodiments may have edges defining a plane angled with respect to the vertical axis of the bell tube 18 and/or housing 1. In some embodiments, the open top end 22 terminates inside the chamber at a level below the top square surface 15 of the housing 1, for example, approximately 25 mm below the top square surface 15 of the housing 1. In some embodiments, the open top end 22 is approximately 100 mm in diameter.

The bell tube 18 is positioned centrally within the chamber 2 and is held in position by connecting means 23 between the top square surface 15 of the housing 1 and a flared rim 24 of the open top end 22 of the bell tube 18. The connecting means 23 may in some embodiments comprise screws or bolts (not shown) that penetrate through protruding lugs 25 that are integral to the flared rim 24 of the open top end 22 of the bell tube 18. It will be appreciated that other connecting means 23 would serve this purpose including the bell tube 18 being an integrally molded part of the housing 1. In other embodiments, the bell tube 18 is not positioned centrally within the chamber 2, but rather, closer to one of the side surfaces 14 of the chamber 2 than another. In some embodiments the bell tube 18 may contact one of the side surfaces, or may be formed integral with one of the side surfaces. In some embodiments, the bell tube 18 is secured within the chamber by connecting means, for example, screws or bolts and lugs or by a bridge of material mechanically coupling the bell tube 18 to one or more internal side or bottom surfaces of the chamber 2, for example, to one or more of the side surfaces 14.

In some embodiments, the riser tube 19 is a tapered cylinder positioned concentrically within the bell tube 18. The angle of the taper of the riser tube 19 may correspond to that of the bell tube 18. The riser tube 19 includes an open bottom end 26 and an open top end 27. The open top end 27 is located at the top square surface 15 of the housing 1. The open top end 27 of the riser tube 19 may comprise the second opening 6 of the conduit 4. The open top end 27 is in some embodiments in fluid communication with the outside of the chamber 2. In some embodiments, the open bottom end 26 of the riser tube 19 has a diameter of approximately 45 mm. In some embodiments, the length of the riser tube 19 is approximately 235 mm.

It will be appreciated that in some embodiments, one or both of the bell tube 18 and the riser tube 19 may have cross sectional areas which are other than circular. Thus, although referred to herein as tubes, one or both of the bell tube 18 and the riser tube 19, and/or their respective upper and/or lower ends, may have cross sectional areas which may be, for example, substantially square, rectangular, or of any other closed regular or irregular polygonal shape as desired. Further, in alternate embodiments, the riser tube 19 may not be positioned concentrically within the bell tube 18, but rather may have a portion which is closer to an internal surface of the bell tube 18 than another portion. Further, in some embodiments, the riser tube 19 and bell tube 18 may share a common wall. In alternate embodiments, the angle of the taper of the riser tube 19 may be greater or less than that of the bell tube 18. For example, in some embodiments, one or both of the riser tube 19 and the bell tube 18 may have substantially parallel vertically extending walls along a portion or along an entirety of their vertical extents.

The bell tube 18 and riser tube 19 are illustrated as including flared open upper ends, however the upper ends of the bell tube 18 and/or riser tube 19 may have different shapes in different embodiments. For example, the open upper ends of the bell tube 18 and/or riser tube 19 may expand in cross sectional area linearly with height. In some embodiments, the open upper ends of the bell tube 18 and/or riser tube 19 may have at least one portion, for example, a wall, which deviates away from a central axis of the bell tube 18 and/or riser tube 19 at a different rate with height than other portions of the open upper ends of the bell tube 18 and/or riser tube 19. In some embodiments, the open upper ends of the bell tube 18 and/or riser tube 19 may have a cross section of a closed geometric shape with multiple walls, for example a square or rectangular cross section. At least one of the walls may be substantially vertical along its vertical extent or may deviate from a central axis of the bell tube 18 and/or riser tube 19 at a different rate along its vertical extent than other walls. In other embodiments, the bell tube 18 and/or riser tube 19 may have a stepped portion where the bell tube 18 and/or riser tube 19 changes in cross sectional area, for example, expands in cross sectional area with height, that is displaced from the open upper end of the bell tube 18 and/or riser tube 19.

The channel 7 located within the conduit 4 is defined by a void between the bell tube 18 and the riser tube 19, and a void within the riser tube 19. In some embodiments, the void between the bell tube 18 and the riser tube 19 completely circumscribes the riser tube 19. In some embodiments, the channel 7 between the bell tube 18 and the riser tube 19 is uniform about the riser tube 19 and along its length and is approximately 25 mm in width and approximately 210 mm in length. In other embodiments, the dimensions of the channel 7 may be non-uniform and/or may differ from these values. In some embodiments it may be desirable to maintain a minimum width, for example, of about 10 mm along the length of the channel 7. In some embodiments, liquid in which the gas scouring device may be immersed may have sufficiently large particulate debris that having a portion of the channel 7 with a width of less than about 10 mm may result in blockage problems created by the debris in the liquid.

Figure 2:
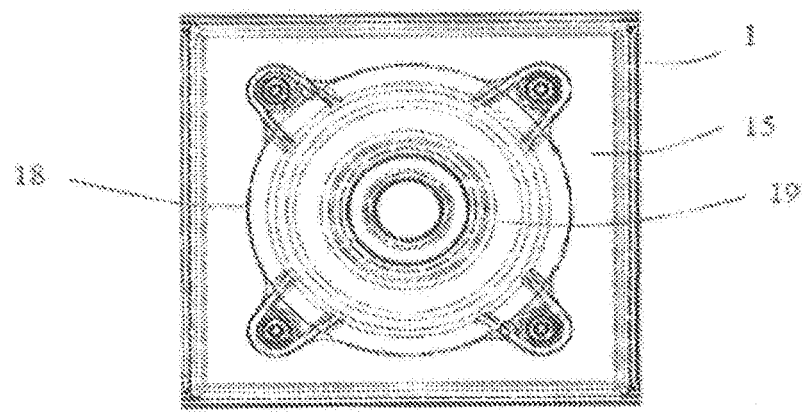
FIG. 2 is a plan view of the gas scouring device of FIG. 1.

FIG. 2 shows a plan view of the gas scouring device of FIG. 1. The top square surface 15 of the housing 1 is depicted as transparent such that the centrally positioned circular shapes of the first cylindrical tube (bell tube 18) and second cylindrical tube (riser tube 19) are visible.

Figure 3:
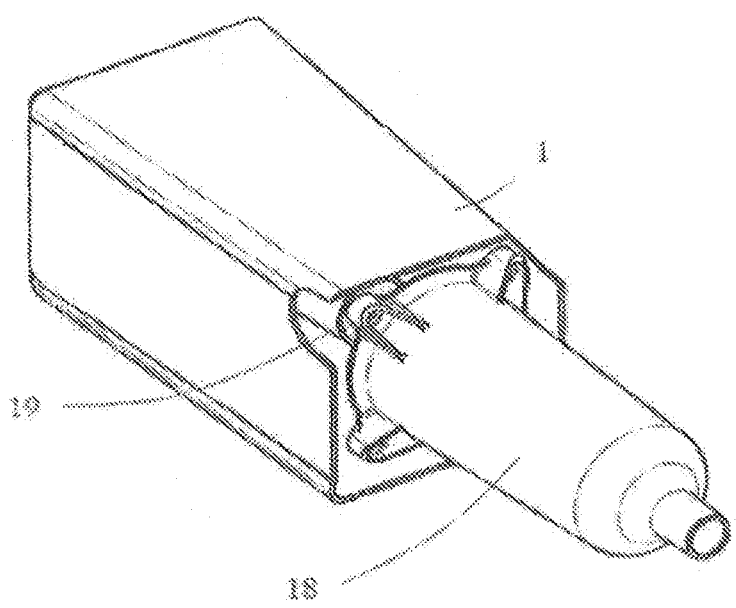
FIG. 3 is a perspective view of the gas scouring device of FIG. 1 in a disassembled state.

FIG. 3 is a perspective view of the gas scouring device of FIG. 1 in a disassembled state. The bell tube 18 is shown removed from the housing 1 and a portion of the wall of the housing 1 is shown as cut-away so the riser tube 19 is visible.

Figure 4:
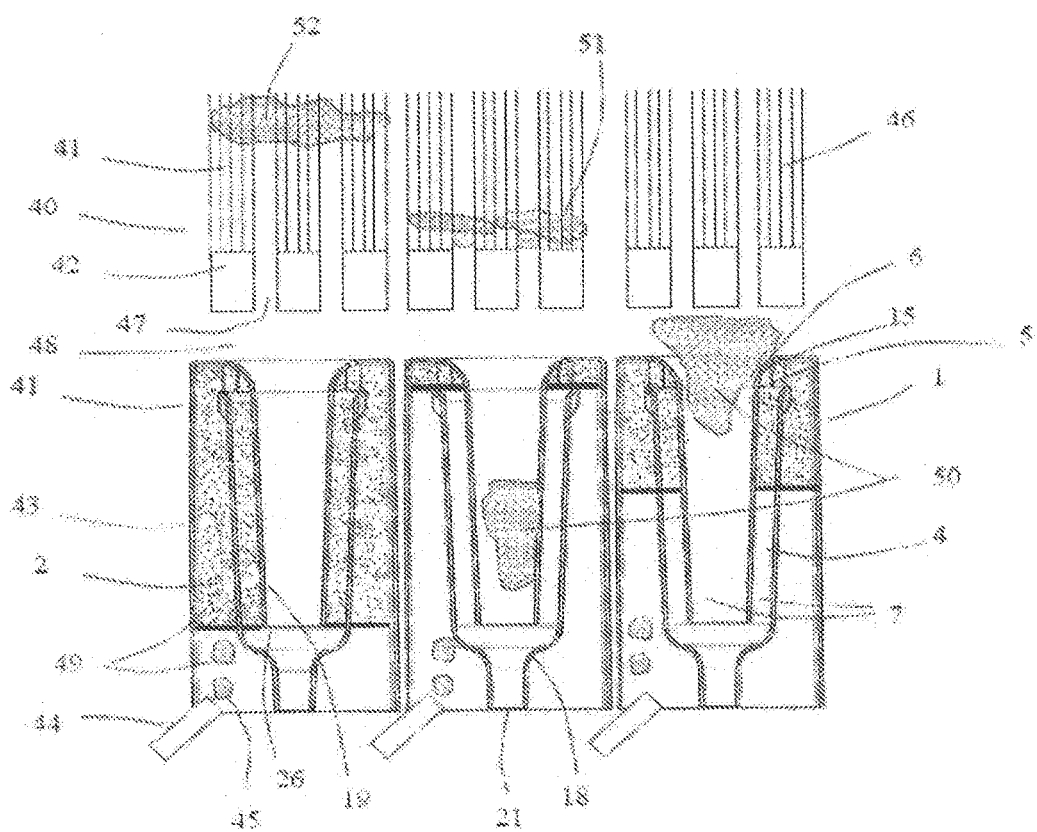
FIG. 4 is a simplified schematic cross-sectional elevational view of a plurality of membrane modules depicting several pulsed gas slug flow phases according to an embodiment.

FIG. 4 depicts an assembly comprising multiple immersed membrane modules 40, each membrane module 40 comprising a plurality of hollow fiber membranes 41, depicted as lines, extending vertically from a plurality of rectangular shaped membrane anchors 42. Each immersed membrane module 40 has one or more gas scouring devices 43 located below, beside, or in combination with the membrane anchors 42. The gas scouring devices may be separated from one another by gaps as illustrated, or in other embodiments, may be coupled to one another. The assembly further includes gas supply pipes 44 having or connected to outlets 45 for discharging gas into each of the chambers 2. The gas supply pipes may introduce gas into the chambers 2 at lower ends as illustrated, or may introduce gas into the chambers though one or more gas outlets passing through walls of the housings 1 above lower extents of the walls. Additionally or alternatively, one or more gas outlets may extend through the opening 3 and introduce gas into the chamber 2 at a position above the opening 3. One or more additional gas outlets may be provided to introduce gas, either continuously or cyclically, into the open bottom end 21 of the bell tube 18. The gas introduced into the open bottom end 21 of the bell tube 18 may pass through the riser tube 19 and form bubbles which scour the membranes of a membrane module associated with the scouring device into which the gas is introduced.

FIG. 4 depicts one gas scouring device 43 located below and aligned with three membrane modules 40. In some embodiments, the width and/or depth of a group of three membrane modules 40 is approximately the same as the width and/or depth of the top square surface 15 of the housing 1 of the gas scouring device 43, for example, approximately 160 mm. In other embodiments a single gas scouring device 43 may be located below and aligned with a single membrane module 40. The width and/or depth of the single membrane module 40 may be approximately the same as the width and/or depth of the top square surface 15 of the housing 1 of the gas scouring device 43. In other embodiments, a single gas scouring device 43 may be located below and aligned with different numbers of membrane modules 40. For example, the arrangement illustrated in FIG. 4 may have a similar cross section through a section normal to that illustrated, rendering each gas scouring device 43 located below and aligned with nine membrane modules 40.

Each membrane anchor 42 supports a plurality of hollow fiber membranes 41 referred to herein collectively as a membrane bundle 46, skein, or curtain. There are gaps 47 between the plurality of membrane anchors 42, and a space 48 between the membrane anchors 42 and the gas scouring device 43. The gaps 47 and space 48 provide for the passage of gas 49 and liquid. It will be appreciated that in some embodiments, the gas scouring device 43 may be directly connected to a membrane module 40, or an assembly of modules 40, rather than decoupled from the membrane modules as depicted in FIG. 4. For example, a top surface 15 of a gas scouring device may be directly coupled to a lower surface of a membrane anchor 42 of a membrane module. The membrane anchor may include one or more apertures which may provide for gas and/or liquid to pass from the gas scouring device through the membrane anchor and into the membrane module to contact and scrub the hollow fiber membranes 41 secured in the membrane anchor. In other embodiments, multiple membrane modules may be mounted in a common manifold, for example, as described in U.S. Pat. No. 8,372,282 titled "MIXING CHAMBER," issued Feb. 12, 2013, incorporated herein by reference, and supplied with gas and/or liquid from one or more gas scouring devices coupled to or spaced beneath the common manifold.

In use, as depicted in FIG. 4, the assembly is immersed in liquid and a source of pressurized gas 49, for example, air is applied, essentially continuously, to a gas supply pipe 44 associated with a gas scouring device (or to multiple gas supply pipes associated with respective multiple gas scouring devices). The gas 49 enters the chamber 2 of the gas scouring device and gradually displaces the liquid within the chamber 2 until the interface between the gas and the liquid reaches the level of the open bottom end 26 of the riser tube 19. At this point, the gas 49 breaks a liquid seal and surges through the open bottom end 26 and upward through the riser tube 19 creating a first slug of gas 50 which flows in the direction of the membrane modules 40 above the gas scouring device. In some embodiments, the first slug of gas 50 sucks liquid through the open bottom end 21 of the bell tube 18 and the open bottom end 26 of the riser tube 19 resulting in a high velocity two-phase gas/liquid flow into the modules 40. Liquid may then enter the gas scouring device through the open bottom end 21 of the bell tube 18 and in combination with liquid entering through the open lower opening 3, may substantially or completely re-fill the conduit 4 and/or chamber 2 with liquid. In some embodiments, the open bottom end 21 of the bell tube 18 may be omitted and the bell tube 18 may be provided with a closed lower end. For example, embodiments are also functional wherein the channel 7 defined in the conduit 4 is closed with the exception of the first opening 5 and the second opening 6 of the conduit 4.

The first gas slug 50 flows through the second opening 6 and may break up into small bubbles 51 when flowing through the gaps 47 between the membrane anchors 42 and/or through apertures in the membrane anchors 42. The small bubbles 51 may rapidly recombine to form a second gas slug 52 above the membrane anchors 42. Thereafter, the second gas slug 52 flows amongst the membranes 41 generating a scouring effect upon the surfaces of the membranes 41. The second gas slug may have a cross sectional area equal to or greater than a cross sectional extent of membranes within a membrane module or modules into which the second gas slug is introduced.

In some embodiments, the diameter or cross sectional area of the first gas slug 50 that exits the second opening 6 of the conduit 4 is approximately equal to the diameter or cross sectional area of the second opening 6. The diameter or cross sectional area of the second gas slug 52 above the membrane anchor 42 is in some embodiments equal to or greater than that of the gas slug 50 below the membrane anchor. Without being bound to a particular theory it is believed that a superior scouring of surfaces of the membranes 41 occurs when the cross sectional extent of the first gas slug 50 is equal to or greater than the lateral extent of an area occupied by a plurality of membrane bundles 46 into which the first gas slug 50 travels. This provides for the gas slugs 52 passing through the membrane modules to have dimensions such that the gas slugs contact all membranes in the membrane modules though which they pass. The provision of gas slugs 52 having diameters or cross sectional areas which encompass the entire cross sectional area occupied by membranes of a membrane module through which the gas slugs 52 pass ensures that all of the surfaces of the membranes 41 will be scoured by the gas slugs 52.

In some embodiments, the ratio of the diameter or cross sectional area of the second opening 6 of the riser tube 19 to the diameter or cross sectional area of the top square surface 15 of the housing 1 is between approximately 0.5 and approximately 1.0. If the cross sectional area of the second opening 6 is a significant portion of that of the top square surface 15, gas slugs emitted from the second opening 6 may extend across an area greater than the cross sectional area of the top square surface 15. When multiple gas scouring apparatus are arranged next to one another gas slugs emitted from one gas scouring apparatus will extend across an area close to or overlapping an area across which gas slugs emitted from an adjacent gas scouring apparatus extend. The provision of overlapping gas slugs from adjacent gas scouring apparatus will help ensure that all filtration membranes positioned above adjacent gas scouring apparatus will be scrubbed by gas slugs from at least one of the adjacent gas scouring apparatus. In FIG. 4 the ratio of the cross sectional area of the second opening 6 of the riser tube 19 to the cross sectional area of the top square surface 15 of the housing 1 is 120 mm/160 mm or 0.75.

In the period of time between the formation of successive first gas slugs 50 in a gas scouring device, the chamber 2 refills with liquid, and generation of another first gas slug 50 begins, resulting thereafter in further cleaning of the membranes 41 within the module 40.

The generation of the first gas slugs 50 is generally random in frequency and duration, however, it will be appreciated that a uniform cyclic generation of first gas slugs 50 may be provided in some embodiments. The gas scouring device 43 described in the embodiments above may be used with a variety of known membrane module 40 configurations and is not limited to the particular arrangements shown. For example, the membrane module 40 configurations could comprise hollow fibers 41 or sheets arranged in curtains or distinct bundles 46. The dimensions of the gas scouring device 43 described in the embodiments are given to provide an example of a workable device, but the aspects and embodiments disclosed herein are not limited to these dimensions.

Figure 5:
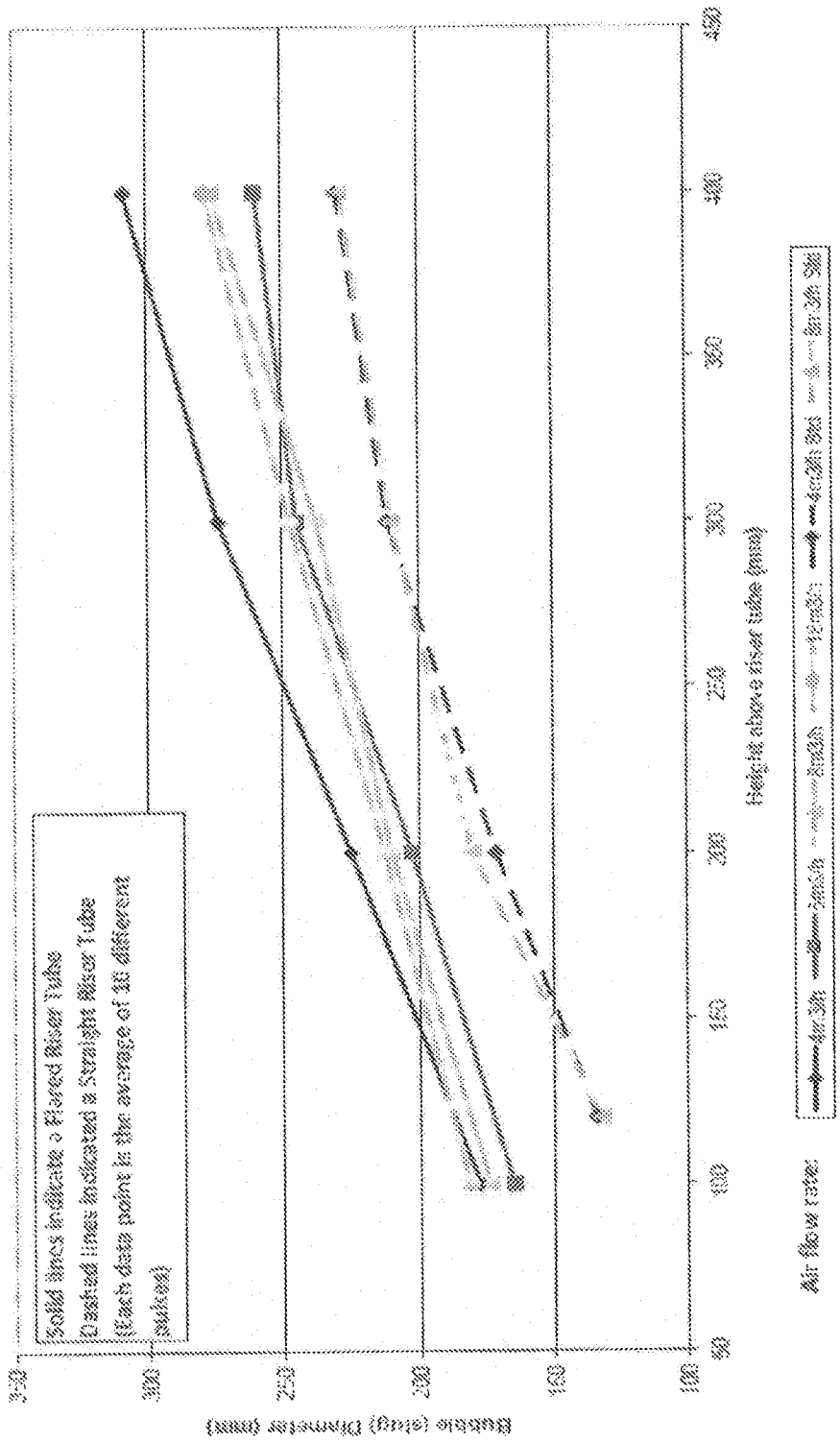
FIG. 5 is a chart depicting gas slug diameters at different heights above a riser tube at different gas flow rates in accordance with an embodiment.

Aspects and embodiments of the gas scouring device described herein provide for more of the surface area of the membranes 41 to be scoured per unit of gas 49 delivered as compared to previously known gas scouring devices. In previously known gas scouring devices, for example, in those including non-tapered and/or non-flared riser tubes 19, the cross sectional area of the first gas slug 50 is often not of a sufficient size to engage with all of the membranes 41 in a module 40 which leads to inefficient membrane scouring. In embodiments of gas scouring devices having non-tapered and non-flared riser tubes 19 which produce a second gas slug 52 of a sufficient cross sectional area to encompass all membranes in a membrane module associated with the gas scouring device, it has been observed that the sufficient cross sectional area is often attained at a location that is undesirably vertically displaced above a lower extent of the membranes 41. This may results in incomplete scouring of the membranes 41. In some embodiments of previously known gas scouring devices, the desired cross sectional area of the second slug 52 is reached at an elevated height (approximately 200 mm as shown in FIG. 5) on the membranes 41 below which the membranes do not receive sufficient scouring.

Example 1

To demonstrate the functionality of a gas scouring device as disclosed herein, a gas scouring device substantially similar to that illustrated in FIGS. 1-3 was positioned below a membrane module composed of hollow fiber membranes having a total length of two meters and a membrane surface area of 34 m². A paddle wheel flow meter was located at the lower end of the riser tube of the gas scouring device to monitor the pulsed liquid flow-rate lifted by gas. A constant supply of gas was provided into the chamber 2 of the gas scouring device at a flow rate of 6 m³/hr. Gas slugs were produced by the gas scouring device and released into the module at a rate of one gas slug every two to six seconds.

These results indicate that a gas scouring device as disclosed herein operated as intended and was capable of producing a series of gas slugs at a substantially random frequency.

Example 2

To demonstrate the ability of gas scouring devices as described herein to produce gas slugs of greater cross sectional area at lower heights above their upper extent than embodiments of previously known gas scouring devices, a study was performed to compare the sizes of gas slugs produced by a gas scouring device as disclosed herein and gas slugs produced by a previously known gas scouring device.

FIG. 5 provides charted data that describes the difference in gas slug size at different heights above a gas scouring device including a flared riser tube as disclosed herein and a gas scouring device including a straight (non-tapered and non-flared) riser tube at different rates of introduction of air into the gas scouring devices. Data points for the gas scouring device including the flared riser tube are illustrated connected by solid lines and data points for the gas scouring device including a straight riser tube are illustrated as connected with dashed lines. The data shows that the gas scouring device including the flared riser tube consistently produced a gas slug size at least about 30% greater in cross sectional area than the gas scouring device including the straight riser tube. Furthermore, a trend is noticeable showing that the lower the air flow rate is the greater the difference in size between the gas slugs produced by the two gas scouring devices. This data shows that a gas scouring device having a flared riser tube uses less air and therefore less energy to achieve the same scouring effect as a gas scouring device having a non-flared riser tube.

Achieving the same scouring effect as a gas scouring device having a flared riser tube with a gas scouring device having a non-flared riser tube is not readily accomplished because of constraints imposed by the size of the tanks that membrane modules may be housed within. To maintain or maximize the surface area of the membranes in a tank of a given size it is necessary to maintain or minimize the volume of the housing of a gas scouring device. Tank volume occupied by the gas scouring device cannot be used to house filtration membranes. Increasing the cross section of a straight (non-tapered and non-flared) riser tube of a gas scouring device without also increasing the cross sectional area of the housing of the gas scouring device has the undesirable effect of decreasing the volume of the gas slugs produced with a given gas supply rate, thereby creating a smaller gas slug cross section. Increasing the length of a straight (non-tapered and non-flared) riser tube of a gas scouring device has the undesirable effect of using up additional space within the tank and thus decreasing the available membrane area.

Having thus described several aspects of at least one embodiment, it is to be appreciated various alterations, modifications, and improvements will readily occur to those skilled in the art. It will be appreciated that further embodiments and exemplifications are possible without departing from the spirit or scope of the aspects and embodiments described. Such alterations, modifications, and improvements are intended to be part of this disclosure, and are intended to be within the spirit and scope of the disclosed aspects and embodiments. Accordingly, the foregoing description and drawings are by way of example only.

The invention claimed is:

1. A gas scouring apparatus comprising:
a housing defining a chamber;
a bell tube having a lower end and an open upper end and including a wall that is tapered between the lower end and the open upper end, the open upper end disposed within the chamber and having a greater cross sectional area than the lower end;
a riser tube including a wall, a lower portion including an open lower end, and an upper portion including a flared open upper end, the lower portion disposed within the bell tube; and
a conduit defined between the wall of the bell tube and the wall of the riser tube and in fluid communication with an internal volume of the riser tube.

2. The apparatus of claim 1, wherein the chamber includes an opening defined in a lower portion of the chamber.

3. The apparatus of claim 2, wherein the riser tube is tapered, the open lower end of the riser tube having a smaller cross sectional area than the open upper end of the riser tube.

4. The apparatus of claim 3, wherein the bell tube is centrally positioned within the chamber.

5. The apparatus of claim 4, wherein the lower portion of the riser tube is positioned concentrically within the bell tube.

6. The apparatus of claim 5, wherein a lower portion of the wall of the bell tube includes a stepped-in neck portion having an open bottom end.

7. The apparatus of claim 1, wherein the conduit includes a first opening within the chamber defined by a wall of the bell tube and a wall of the riser tube.

8. The apparatus of claim 7, wherein the conduit includes a second opening defined in an upper surface of the housing.

9. The apparatus of claim 8, wherein the second opening is above the first opening.

10. The apparatus of claim 9, wherein the second opening is the flared open upper end of the riser tube.

11. The apparatus of claim 10, wherein the conduit circumscribes the riser tube.

12. The apparatus of claim 11, further comprising a gas inlet configured and arranged to deliver gas into the chamber.

13. An assembly comprising:
a membrane module including a filtration membrane secured in a membrane anchor; and
a gas scouring apparatus positioned below the membrane anchor, the gas scouring apparatus including:
a housing defining a chamber;
a bell tube having a lower end and an upper end and including a wall that is tapered between the lower end and the open upper end, the open upper end disposed within the chamber and having a greater cross sectional area than the lower end;
a riser tube including a wall, a lower portion including an open lower end, and an upper portion including a flared open upper end, the lower portion disposed within the bell tube; and
a conduit defined between the wall of the bell tube and the wall of the riser tube and in fluid communication with an internal volume of the riser tube.

14. The assembly of claim 13, wherein a space is defined between the gas scouring apparatus and the membrane anchor.

15. The assembly of claim 14, further comprising a plurality of membrane modules.

16. The assembly of claim 15, wherein the plurality of membrane modules are mounted in a common manifold.

17. The assembly of claim 15, wherein the gas scouring apparatus is configured to deliver gas slugs to each of the plurality of membrane modules.

18. The assembly of claim 17, wherein the gas scouring apparatus is configured to deliver gas slugs having a cross sectional area greater than the combined cross sectional area of each of the plurality of membrane modules.

19. The assembly of claim 13, wherein the gas scouring apparatus is connected to the membrane anchor.

20. The assembly of claim 19, wherein the membrane anchor includes an aperture configured to direct gas from the gas scouring apparatus into the membrane module.

21. The assembly of claim 20, wherein the bell tube includes an open bottom end and the assembly further comprises a gas outlet positioned to supply gas into the open bottom end of the bell tube.

22. A method comprising:
immersing a filtration assembly in a liquid to be filtered, the assembly including:
a membrane module including a filtration membrane secured in a membrane anchor; and a gas scouring apparatus positioned below the membrane anchor, the gas scouring apparatus including:
a housing defining a chamber;
a bell tube having a lower end and an open upper end and including a wall that is tapered between the lower end and the open upper end, the open upper end disposed within the chamber and having a greater cross sectional area than the lower end;
a riser tube including a wall, a lower portion including an open lower end, and an upper portion including a flared open upper end, the lower portion of the riser tube disposed within the bell tube; and
a conduit defined between the wall of the bell tube and the wall of the riser tube and in fluid communication with an internal volume of the riser tube; and
applying a gas at a substantially constant rate into the chamber.

* * * * *